(12) United States Patent
Bechtolsheim et al.

(10) Patent No.: US 7,215,641 B1
(45) Date of Patent: *May 8, 2007

(54) PER-FLOW DYNAMIC BUFFER MANAGEMENT

(75) Inventors: Andreas V. Bechtolsheim, Stanford, CA (US); David R. Cheriton, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/979,928

(22) Filed: Nov. 2, 2004

Related U.S. Application Data

(63) Continuation of application No. 10/307,805, filed on Dec. 2, 2002, now Pat. No. 6,829,217, which is a continuation of application No. 09/238,552, filed on Jan. 27, 1999, now Pat. No. 6,515,963.

(51) Int. Cl.
*H04L 12/56* (2006.01)
(52) U.S. Cl. .................. 370/235; 370/395.32; 370/392
(58) Field of Classification Search ................ 370/235, 370/229, 230, 231, 389, 392, 395.31, 395.32, 370/401, 412, 428, 429
See application file for complete search history.

(56) References Cited

U.S. PATENT DOCUMENTS

| 5,088,032 | A |   | 2/1992  | Bosack ........................ 395/200 |
| 5,224,099 | A |   | 6/1993  | Corbalis et al. ........... 370/94.2 |
| 5,359,592 | A |   | 10/1994 | Corbalis et al. .............. 370/17 |
| 5,473,607 | A |   | 12/1995 | Hausman et al. ........ 370/85.13 |
| 5,546,389 | A | * | 8/1996  | Wippenbeck et al. ....... 370/412 |
| 5,561,663 | A |   | 10/1996 | Klausmeier ................... 370/17 |
| 5,708,659 | A |   | 1/1998  | Rostoker et al. ............ 370/392 |
| 5,898,671 | A |   | 4/1999  | Hunt et al. ................. 370/235 |
| 6,034,945 | A | * | 3/2000  | Hughes et al. .............. 370/230 |

(Continued)

OTHER PUBLICATIONS

Abhijit K. Choudhury et al., "Dynamic Queue Length Thresholds for Multipriority Traffic," 15th International Teletraffic Congress, a publication of Bell Laboratories, Jun. 1997.

(Continued)

*Primary Examiner*—Brian Nguyen
(74) *Attorney, Agent, or Firm*—Campbell Stephenson Ascolese LLP

(57) ABSTRACT

The present invention provides a per-flow dynamic buffer management scheme for a data communications device. With per-flow dynamic buffer limiting, the header information for each packet is mapped into an entry in a flow table, with a separate flow table provided for each output queue. Each flow table entry maintains a buffer count for the packets currently in the queue for each flow. On each packet enqueuing action, a dynamic buffer limit is computed for the flow and compared against the buffer count already used by the flow to make a mark, drop, or enqueue decision. A packet in a flow is dropped or marked if the buffer count is above the limit. Otherwise, the packet is enqueued and the buffer count incremented by the amount used by the newly-enqueued packet. The scheme operates independently of packet data rate and flow behavior, providing means for rapidly discriminating well-behaved flows from non-well-behaved flows in order to manage buffer allocation accordingly. Additionally, the present invention adapts to changing flow requirements by fairly sharing buffer resources among both well-behaved and non-well-behaved flows.

38 Claims, 9 Drawing Sheets

U.S. PATENT DOCUMENTS

| | | | | |
|---|---|---|---|---|
| 6,073,076 | A | * | 6/2000 | Crowley et al. ............ 701/208 |
| 6,094,435 | A | * | 7/2000 | Hoffman et al. ............ 370/414 |
| 6,175,871 | B1 | | 1/2001 | Schuster et al. ............ 709/231 |
| 6,201,755 | B1 | | 3/2001 | Pillar et al. ............ 365/230.01 |
| 6,292,483 | B1 | | 9/2001 | Kerstein ................... 370/389 |
| 6,515,963 | B1 | | 2/2003 | Bechtolsheim et al. ..... 370/229 |
| 6,584,111 | B1 | | 6/2003 | Aweya et al. ............... 370/412 |

OTHER PUBLICATIONS

Abhijit K. Choudhury et al., "Dynamic Queue Length Thresholds for Shared-Memory Packet Switches," Bell Laboratories, a publication of IEEE/ACM Transactions on Networking, vol. 6, No. 2, Apr. 1998, pp. 130-140.

Abhijit K. Choudhury et al., "Dynamic Thresholds for Multiple Loss Priorities," Bell Laboratories, Lucent Technologies, a publication of IEEE ATM '97 Workshop, May 1997.

Sally Floyd et al., "Random Early Detection Gateways for Congestion Avoidance," vol. 1, No. 4, (Aug. 1993), IEEE/ACM Transactions on Networking, pp. 397-413 (Abstract Only).

R. Guérin, et al., "Scalable QoS Provision Through Buffer Management," Computer Communication Review, a publication of ACM No. 4, Oct. 1998, ISSN #0146-4833.

Dong Lin et al., "Dynamics of Random Early Detection," Computer Communication Review, a publication of ACM SIGCOMM, vol. 27, No. 4, Oct. 1997, ISSN #0146-4833.

* cited by examiner

PER-FLOW DYNAMIC BUFFER MANAGEMENT

This application is a continuation of U.S. patent application Ser. No. 10/307,805 (now U.S. Pat. No. 6,829,217), entitled "Per-Flow Dynamic Buffer Management," filed Dec. 2, 2002 and naming Andreas V. Bechtolsheim and David R. Cheriton as inventors, which in turn is a continuation of U.S. patent application Ser. No. 09/238,552 (now U.S. Pat. No. 6,515,963), entitled "Per-Flow Dynamic Buffer Management," filed Jan. 27, 1999, and naming Andreas V. Bechtolsheim and David R. Cheriton as inventors. The above-referenced applications are hereby incorporated by reference herein in their entirety.

BACKGROUND OF THE INVENTION

1. Field of the Invention

The present invention relates to internetworking systems and in particular to methods and apparatus for managing traffic flow in routers and switches.

2. Description of the Related Art

Internetworking encompasses all facets of communications between and among computer networks. Such communications data flow streams may include voice, video, still images, and data traffic. All have widely varying needs in terms of propagation delay (or latency) during transit through the network. Various systems and devices, both in hardware and in software, have attempted to deal with the plethora of data flow requirements present in modern internetworking systems.

One such scheme consists of attempting to regulate the traffic within the router or switch connecting multiple networks in the typical internetworking system at either the data link or network function levels. (The functions performed at each level are defined in the open systems interconnection (OSI) reference model. This model is well known in the art. See, e.g., Merilee Ford, et al., *Internetworking Technologies Handbook*, Cisco Press 1997.) Such schemes attempt to provide fair allocation of data throughput capacity (bandwidth) by allocating router buffer and/or queue space according to the type of packets in each flow stream received.

A particular problem in internetworking traffic regulation arises from the variety of traffic sources or flows presented to the router/switching device. Referring to FIG. 1, illustrating a high-level schematic view of the operation of a prior art router/switch 10, a number of input flows 20 are presented to the unit. These flows each consist of multiple packets of data, in a variety of sizes and presented at a variety of rates. Additionally, flows may be presented in different protocols, such as the Transmission Control Protocol/Internet Protocol (TCP/IP) and the related User Datagram Protocol (UDP), File Transfer Protocol (FTP), Terminal Emulation Protocol (Telnet), and Hypertext Transfer Protocol (HTTP). Other internetworking protocols are found in the literature, such as Merilee Ford, et. al., *Internetworking Technologies Handbook*, Cisco Press 1997, incorporated herein by reference in its entirety. The packets are buffered in a buffer pool 30, which is typically random access memory (RAM). Buffering is accomplished according to the directives of a controller 60 and a buffer manager 25. The flows are sent to the proper output port 70 by way of a set of output queues 40 and a port scheduler 50, discussed below. Controller 60, buffer manager 25, and port scheduler 50 are conventionally implemented as one or more high speed microprocessors with associated interface circuitry. Buffer manager 25 and port scheduler 50 are also implemented as ASICs.

Some flows are well-behaved in the event of traffic congestion: when faced with packet drops (i.e., packets discarded deliberately by a downstream device due to congestion at that device), these "good" (robust) flows reduce their flow rates and send less packets per unit of time. Other flows, however, are not well-behaved. These non-adaptive "aggressive" flows (NAFs) do not throttle back the flow of packets to the router when they experience drops. This may be because the NAFs do not recognize the congestion, sometimes due to protocol incompatibilities, or (more likely) because they actually are trying to capture more router bandwidth. The latter situation arises particularly in flows sent by sources that consider themselves higher priority than all others (hence the term "aggressive"); such priority assumptions by one flow are often in error in the modem, highly heterogeneous networks seen today.

Several regulation schemes are known in the art. Broadly classified, these schemes fall into two types: queue-based and buffer-based.

In queue-based schemes, incoming flows are classified according to their actual priority, as determined by the receiving router, and assigned accordingly to output queues within the router. High priority flows, such as time-sensitive voice traffic, are placed in a queue that is read out more often. Low priority flows, such as file transfer protocol (FTP) or hypertext transfer protocol (HTTP) flows, are placed in queues that are read out of the router at a slower rate. Numerous schemes, discussed below, are used to control the buffering and enqueuing methods to achieve a measure of throughput balance or fairness among flows, thus managing router/switch bandwidth as efficiently as possible. As will be seen, however, all of these schemes have drawbacks in cost, capacity, and efficiency that suggest a better scheme is needed.

In the extreme, queue-based flow management assigns one queue per input flow. Queues are read out of the router according to statistically fair scheduling process, such as round-robin employing port scheduler 50. In round-robin scheduling, one packet is read out of each queue, one queue at a time, reading again from the first queue only when one packet has been read out from every other queue. This system is known as fair queuing (FQ), or weighted fair queuing (WFQ). While FQ and its variants operate well when the number and variety of input flows is small and well-behaved, they becomes inefficient when the number of flows grows. Clearly, a high number of flows requires a large number of queues, consuming a proportionally larger amount of resources, both in hardware and in operational complexity. More memory and more software processing overhead is required to set up and tear down the queues as flows begin and end. In the context of the modem, high volume networks seen today, this extra cost and complexity is undesirably inefficient.

A less extreme queue-based technique is random early drop (RED) and variants thereon. In a RED scheme, a smaller number of queues (less than the total number of input flows present at any time) is maintained. Flows are segregated into queues by flow volume, with a number of high volume flows placed in one queue. Each queue is managed according to a probabilistic flow rule that causes packets to be dropped more often in the queues associated with the heaviest flows. Because of this relationship, heavy flows experience packet drops more often, statistically, than other flows. This scheme achieves a measure of fairness, but it assumes that heavy flows will be well-behaved, i.e., that they will reduce flow rate when they experience packet drops. This assumption has proven to be erroneous in the modern heterogeneous network. Certain NAFs do not reduce flow rate and thus continue to take an unfair amount of router bandwidth simply because they counter packet drops with retransmissions. The "good" flows get less and less throughput as they reduce flow rate in response to drops while the NAFs capture more bandwidth.

As a further drawback, the random packet drops sometimes hit a fragile flow. These flows contain time-critical traffic of the highest priority, such as voice data. Fragile flows have the lowest tolerance for drops and delay, so a random packet drop management scheme can have a highly detrimental effect on them.

An alternative to managing router/switch traffic at the queue end is to manage flows at the buffer end, referring to buffer pool 30 of FIG. 1. The basic premise of buffer-based management is that if one limits how much of a particular input flow gets into buffers 30 relative to other input flows 20, the output queues 40 will take care of themselves. Such limits on the number of packets buffered per flow can be either static or dynamic.

In the static or strict limit scheme, a set maximum number of buffers is available for each flow. Any packets received after those buffers are full are discarded. Static limits are set by the system administrator for each type of flow. However, this scheme has the obvious drawback of high overhead associated with setting up a gating mechanism for each flow and administrative oversight. Additionally, it lacks long-term flexibility to adapt to the wide variety and constantly changing mix of flow types seen in modem internetworking.

Typical prior art systems implement static buffer limitation schemes in software with limited hardware support. All experience the same or similar drawbacks noted above due to overhead (set up and tear down, as well as processing time delay and hardware resource) costs. Furthermore, typical prior art systems implement buffer limitation schemes based on a limit that is imposed per output queue or per class of service required by the received packet. FIG. 2 illustrates the standard bit configuration for an Internet Protocol (IP) packet, including the fields within its header. Class of service information, sometimes referred to as flow type or flow classification, can be found in, for instance, the precedence or type of service (TOS) field 210 in the IP received packet header 200 or in the source address 220 or a combination thereof. These systems also either set their limit values from manually configured parameters or else update them at a relatively slow periodic rate compared to packet rates.

Current schemes are unable to update their limit values fast enough to keep up with changing traffic conditions in the latest generation of ultra-fast (e.g., Gigabit speed) flows. As an additional drawback, the use of TOS field 210 is not standardized among internetworking users. Thus, neither TOS nor source address is a reliable means of identifying flow type at this time.

What is needed is a scheme to rapidly identify good flows from bad (i.e., the well-behaved flows vs. the non-adapting aggressive flows) on a packet-by-packet basis. Furthermore, a flexible, low-overhead, extremely fast dynamic buffer limiting method and apparatus to fairly buffer and enqueue the wide variety of good flows and NAFs found in today's networks is also needed.

SUMMARY OF THE INVENTION

The present invention provides a per-flow dynamic buffer management scheme for a data communications device. With per-flow dynamic buffer limiting, the header information for each packet is mapped into an entry in a flow table, with a separate flow table provided for each output queue. Each flow table entry maintains a count of buffers currently in the queue for each flow. On each packet enqueuing action, a dynamic buffer limit is computed for the flow and compared against the number of buffers already used by the flow to make a mark, drop, or enqueue decision. A packet in a flow is dropped or marked if the buffer count is above this limit. Otherwise, the packet is enqueued and the count incremented by the number of cells in the newly-enqueued packet.

The scheme operates independently of packet data rate and flow behavior, providing packet-specific means for rapidly discriminating well-behaved flows from aggressive, non-adapting (badly behaved) flows in order to manage buffer allocation accordingly. Additionally, the present invention adapts to changing flow requirements by fairly sharing buffer resources. The present invention handles robust, well-behaved flows that adapt to congestion situations signaled by packet drop, fairly sharing bandwidth among these flows. The present invention also ensures good service for fragile flows (those sending few packets and those of a time critical nature) such as Voice-over-Internet Protocol (VoIP), thereby protecting them from non-adapting aggressive flows (NAFs).

BRIEF DESCRIPTION OF THE DRAWINGS

The present invention may be better understood and its numerous objects, features, and advantages made apparent to those skilled in the art by referencing the accompanying drawings.

The use of the same reference symbols in different drawings indicates similar or identical items.

DETAILED DESCRIPTION

Overview

The dynamic buffer limiting scheme of the present invention is based on two interrelated approaches. First, a mapping of packet header information is used to approximate the per-flow buffer state by storing a count of currently enqueued buffers for each flow into a flow table entry, rather than a separate queue per flow. Second, the dynamic buffer limit (DBL) is determined by lookup in a pre-existing (but frequently recalculated) table or by live computation, indexed by parameters representing the dynamic state of the internetworking device. The DBL is re-determined on each packet reception. The packet header mapping avoids the per-flow lookup, set up, and tear down overhead of prior art queue-based management schemes. The present invention also solves the prior art problem of inflexibility in revising queue limits according to the rapidly changing buffer usage and queue length conditions in the modem network. Working together, as further discussed below, these two approaches allow the system to rapidly identify well-behaved, robust ("good") flows from NAFs and to provide fair queuing and efficient router/switch resource utilization for all flows.

Although the terms router and/or switch will be used generally in this specification, those skilled in the art will realize that other related internetworking devices may be used, in addition to routers or switches, to perform analogous functions. Accordingly, the invention is not limited to any particular type of internetworking device, router, or switch. Also, although the primary focus of the current invention is Internet Protocol (IP) packet flows, those skilled in the will art realize that protocols and flows other than IP, such as Ethernet, can be benefit from the present invention and its alternate embodiments. Accordingly, the invention is not limited to any particular type of protocol or packet format.

Figure 2:
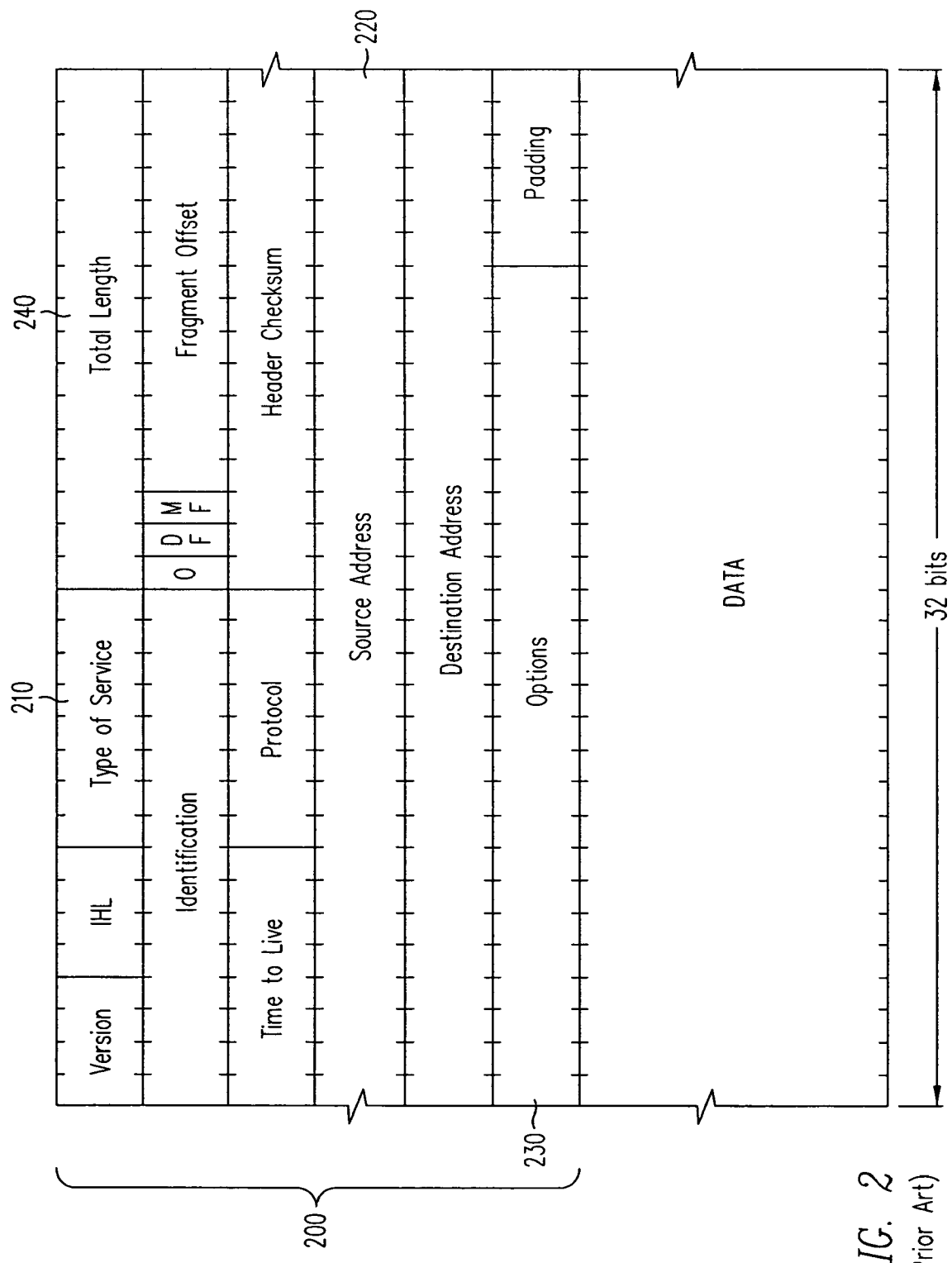
FIG. 2 is a bitmap of a prior art Internet Protocol (IP) packet showing the fields within its header.
Figure 3:
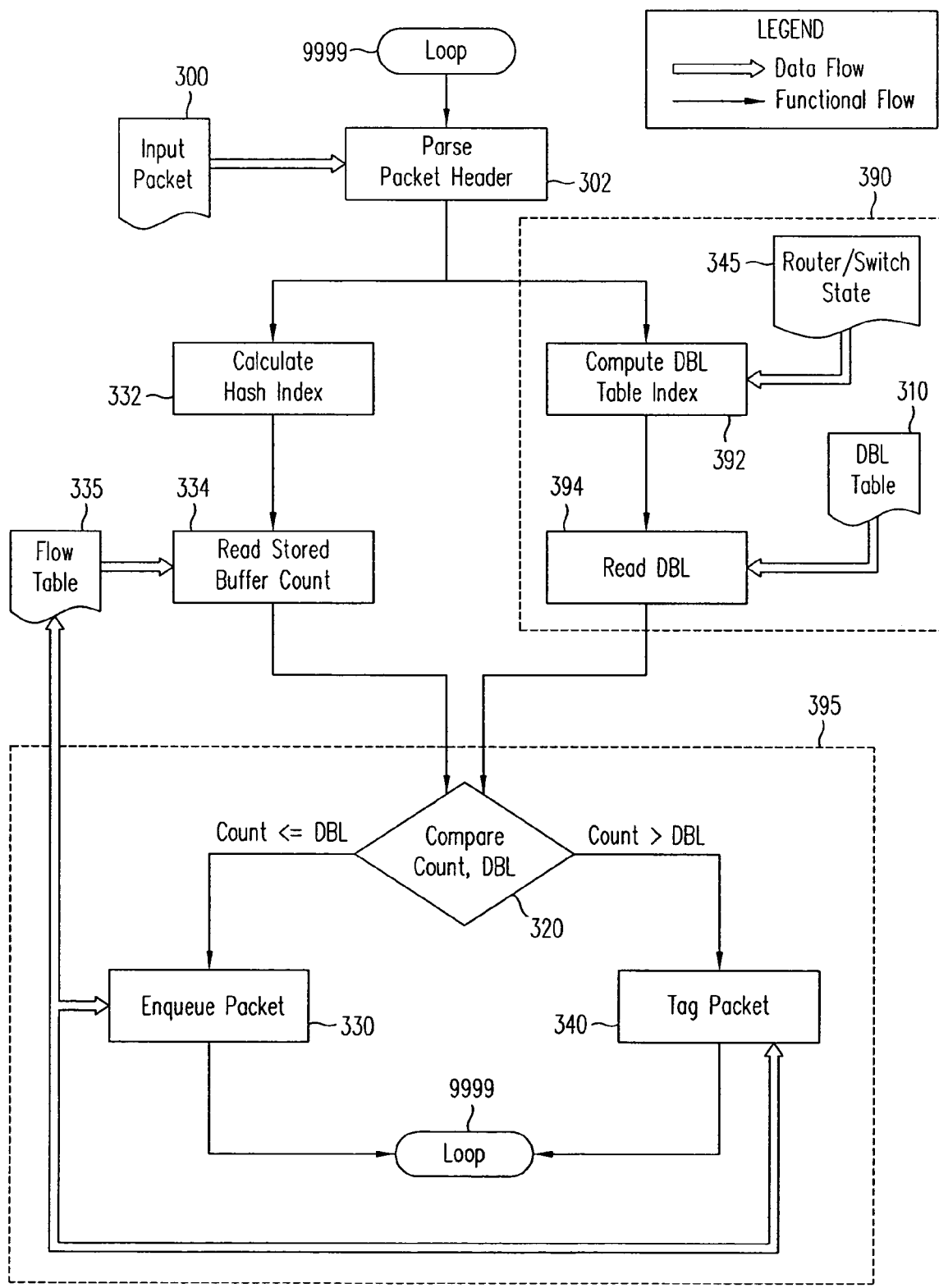
FIG. 3 is a flow chart of one embodiment of the enqueuing aspect of the present invention.

FIG. 3 illustrates the high-level process involved in queue-based management through dynamic buffer limiting, specifically focused on the computations and transformations of the enqueuing operation. Upon receipt of a packet in a given flow, 300, the packet header is parsed 302 to determine the packet size, source address, destination address, and type of service (TOS). Additionally, the UDP source and destination port (for an IP packet) or the MAC source and destination and protocol type (for Ethernet packets) may be extracted as required to fully identify the necessary TOS. Refer to FIG. 2 for the bitwise locations of this information within the industry-standard IP packet header 200. The number of buffer elements or cells, which may be counted in terms of bytes or groups of bytes, required to buffer the incoming packet is computed (not shown).

Figure 1:
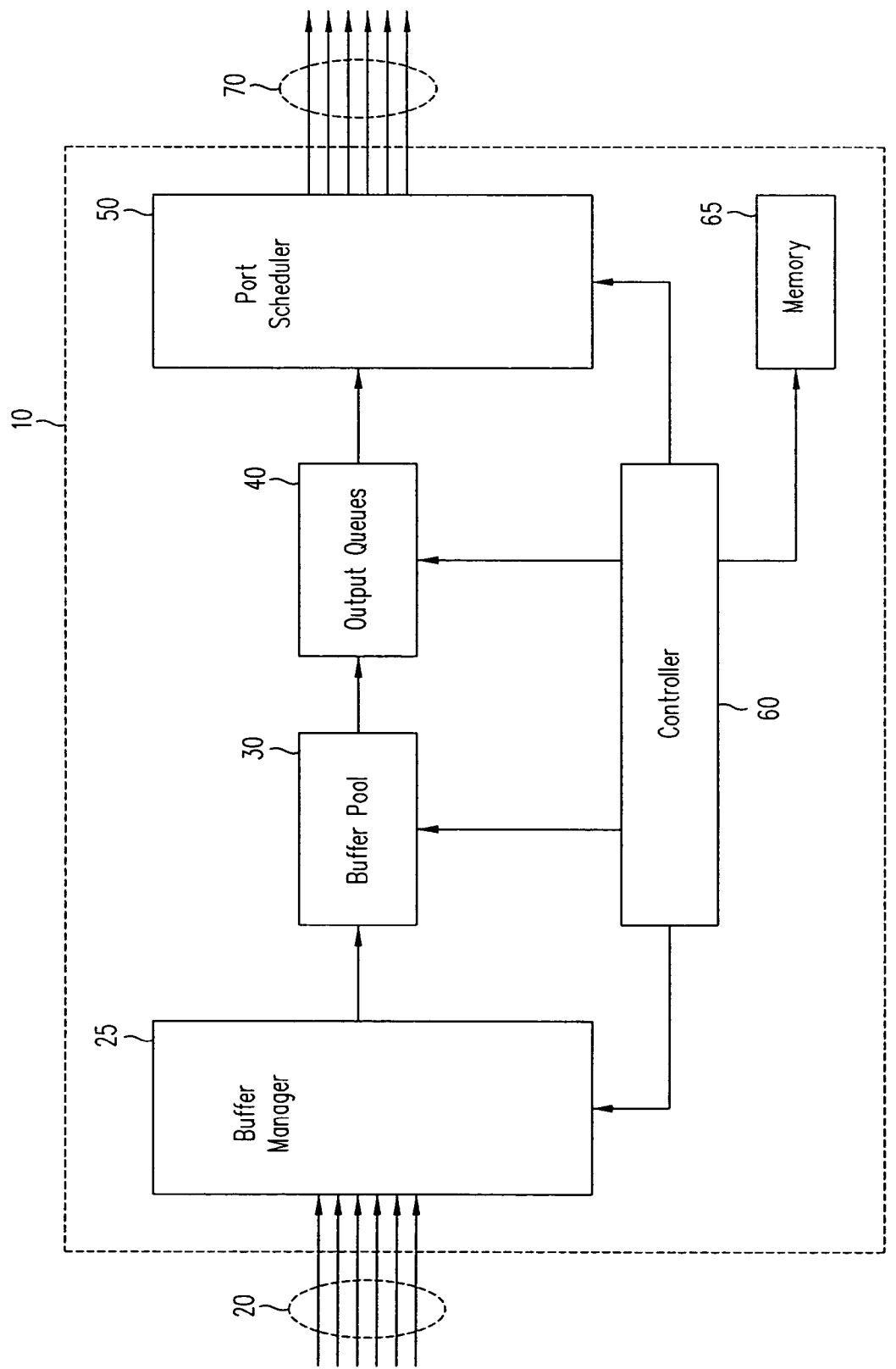
FIG. 1 is a high-level schematic representation of data flow and control in a prior art communications device.

All steps in the process of the present invention are implemented in a conventional router or switch system well known in the art, such as that depicted in FIG. 1. Other examples of such systems may be found in U.S. Pat. No. 5,088,032, METHOD AND APPARATUS FOR ROUTING COMMUNICATIONS AMONG COMPUTER NETWORKS, to Leonard Bosack; U.S. Pat. No. 5,224,099, CIRCUITRY AND METHOD FOR FAIR QUEUING AND SERVICING CELL TRAFFIC USING HOPCOUNTS AND TRAFFIC CLASSES, to Corbalis, et al.; U.S. Pat. No. 5,359,592, BANDWIDTH AND CONGESTION CONTROL FOR QUEUE CHANNELS IN A CELL SWITCHING COMMUNICATION CONTROLLER, to Corbalis, et al.; U.S. Pat. No. 5,473,607, PACKET FILTERING FOR DATA NETWORKS, to Hausman et al.; and U.S. Pat. No. 5,561,663, METHOD AND APPARATUS FOR PERFORMING COMMUNICATION RATE CONTROL USING GEOMETRIC WEIGHTED GROUPS, to Daniel Klausmeier, incorporated in their entirety herein by reference.

One of ordinary skill in the art will recognize that the above described parsing step may be accomplished by either hardware or software means or a combination thereof, such as a lookup table. Accordingly, the present invention is not limited to any particular parsing means.

Hash Mapping of Flows to Flow Entries

In a substantially parallel process, the extracted header data is transformed by calculating a hash index 332 according to the following function, expressed in the C programming language:

```
hdr_ip* iph = (hdr_ip*)pkt → access(off_ip_);    // get pointer to IP
                                                  header portion of
                                                  packet
int i = (int)iph → src( );                       // get source IP
                                                  address
int j = (int)iph → dst( );                       // get destination
                                                  IP address
int k = i + j;                                   // add src and dst
return (k + (k >> 8) + -(k >> 4)) % ((2 << 19) - 1); // shift, add, divide
                                                  modulo a large
                                                  prime
```

Alternatively, the following function can also be used to calculate hash index 332:

```
hdr_ip* iph = (hdr_ip*)pkt → access(off_ip_);   // get pointer to IP
                                                 header portion of
                                                 packet
int i = (int)iph → src( );                      // get source IP address
int j = (int)iph → dst( );                      // get destination IP
                                                 address
i = i ^ j;                                      // XOR src and dst
i ^ = i >> 16;                                  // shift high order to
                                                 low order
i ^ = i >> 8;                                   // shift again
return i;
```

The output of this function is an index to flow table 335 for the designated output queue for the given input flow. One of ordinary skill in the art will recognize the process of computing a table lookup index based on a limited range of inputs as a generic hash function (or hashing), novel here in the choice of both input parameters and the precise hash function performed on those inputs. Such hashing may be accomplished with hardware or software means or a combination thereof, as is well known in the art.

The flow identifying information contained in the packet header (sometimes called the "flow label" in the art) is hashed in order to reduce the huge range of packet header values into a single compact, easily manipulated field having a far smaller range of values. Hashing avoids the per-flow lookup, set up, and tear down overhead of prior-art systems. For example, this embodiment of the present invention does not maintain flow table entries for each and every flow. Rather, of the $2^{160}$ possible flows uniquely identified by the first five 32-bit words in the IP packet header, the hash function limits the flow table to just $2^n$ entries, substantially less than the unhashed situation. In other words, flow table 335 consists of $2^n$ entries, where n=the number of bits in the output of the hash function above. In one embodiment, a 19 bit hash index is used, supporting 512K entries. This provides the advantage of needing fewer bits to identify a table entry corresponding to a particular flow, thus reducing the overhead and resource cost of this particular embodiment over the prior art.

For smaller network applications, such as those on an enterprise scale, a flow table of $2^{16}$ or 64 K entries (n=16) appears to be sufficient, implying a hash function yielding 16 bits. For larger scale internetworking, such as Internet Service Provider (ISP) backbones, flow table of at least 256 K to 1 M entries (218 to 220 entries) should be provided to accommodate the large number of flows seen in such applications.

Although an IP packet is described, those skilled in the will art realize that datagrams or packets other than IP packets can be used. Other datagram formats are accommodated simply by determining the type of datagram received by methods well-known in the art, such as reading identifying data from the header, and applying the hash function described above to the appropriate data fields. Accordingly, the invention is not limited to any particular type of datagram.

The hashing embodiment of the present invention only approximates a flow-specific management scheme, because multiple flows could potentially be mapped to the same flow table hash bucket. Such a situation is referred to as a hash collision.

Hash collisions, in isolation, have little or no effect on the flows involved. Hash collisions are made low probability by providing a large number of flow entries and because NAFs are expected to be a small percentage of flows. Each incoming packet is tested against the current count of stored buffers in the hash bucket. It will be marked, dropped, or enqueued accordingly, as expected. The fact that the count stored in the flow table bucket may be in error will have no real effect, because at worst a NAF packet, such as a high-speed User Datagram Protocol (UDP) flow with no rate adaptation on packet drop, will be enqueued a few times when it should have been limited. In the short term, this will result in some inefficiency, but (since the buffer count will be incremented twice as often), the flows will both soon be limited.

Persistent hash collisions, on the other hand, as when a NAF and a fragile flow are mapped to the same bucket, will result in greater inefficiencies and unfair bandwidth allocations. Though the probability of such an event is low, due to the relative rarity of both NAFs and hash collisions themselves, such a situation is undesirable. Persistent hash collisions between flows that happen to hash into the same bucket can be avoided by periodically changing the hash seed on the hash function 332 above (referring to FIG. 3) used to compute the hash index from the packet header. In a hardware implementation of the present invention, this change of hash seed may be under software control. Periodic change of hash seed is used because there is no way to determine whether a hash collision is occurring. Detecting collisions would require keeping explicit flow state at a significant implementation, and likely performance, cost.

Figure 4:
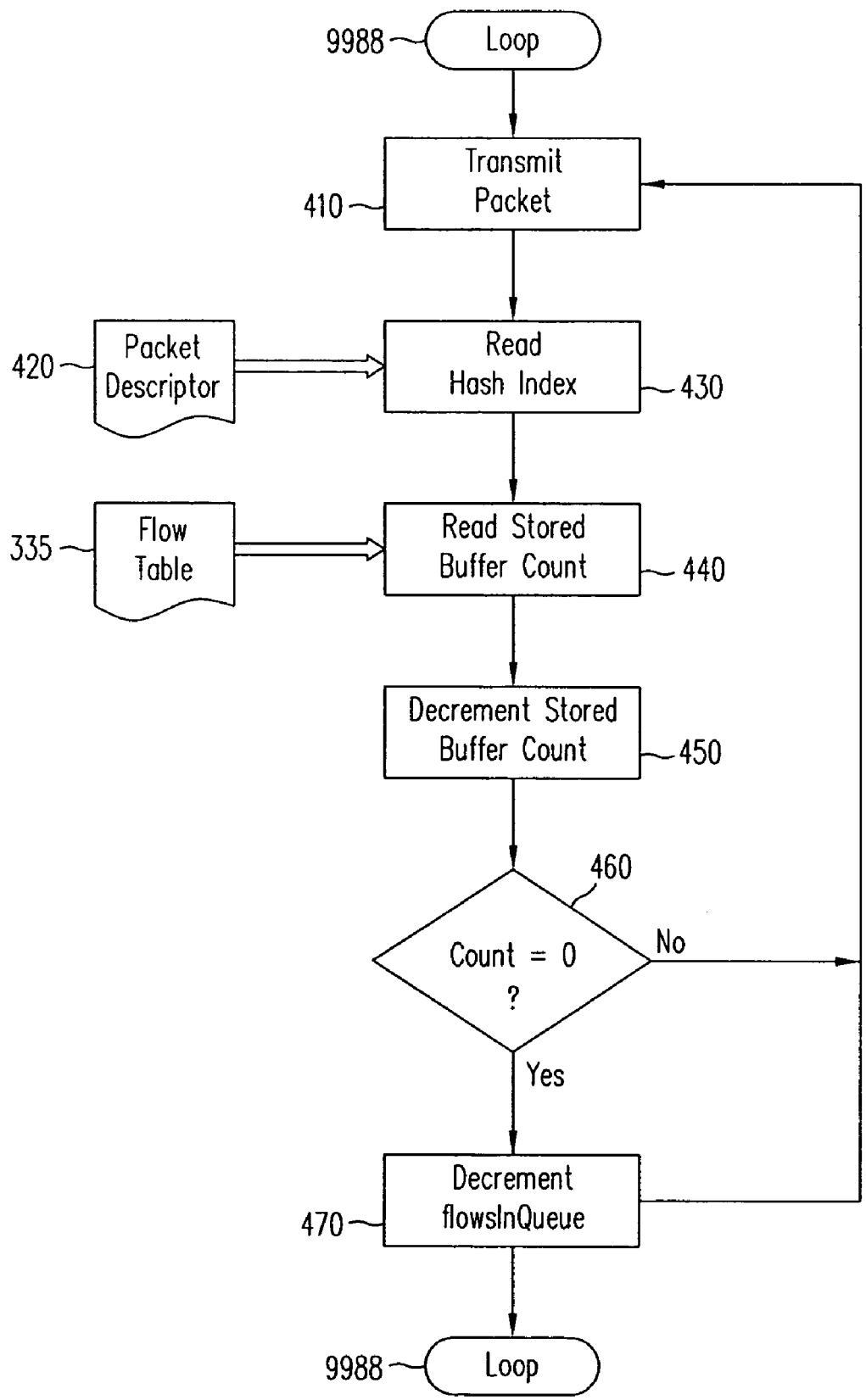
FIG. 4 is a flow chart of the process whereby data is read out of the queue and transmitted out into the network, according to one embodiment of the present invention.

The hash index is stored in the packet descriptor field in the transmit (output) queue for later use in transmitting the packet (FIG. 4). The packet descriptor field also contains the packet length, rewrite information, and a pointer to the start of the data buffer for the packet.

The ability to revise the hash seed is appropriate in any case to guard against potentially anomalous behavior at a particular installation. By storing the original hash index in the packet descriptor, 420, for each packet, the stored buffer count is updated correctly even if the hash seed was changed between packet reception and transmission.

The above hashing scheme is one embodiment of mapping a packet in a flow to an index identifying the associated flow table entry. This mapping can be realized by a number of other methods. As one alternative, the extracted header fields can be concatenated to form a key that is input to a content-addressable memory (CAM). If the key matches an entry in the CAM, the CAM returns the address of the first matching entry. This address can then be used directly as the index to identify the flow table entry. Alternatively, the value returned by the CAM can be used to address a second memory that provides the index to identify the flow table entry. In such an embodiment, if a key does not match in the CAM, a matching entry is allocated and initialized. A default entry or set of entries may be selected if the CAM is full. When a flow table entry is reduced to zero buffer usage, the associated CAM entry can be recorded as free, making it available for allocation to a new flow key. The matching of the key to entry can be an exact match using a binary CAM or partial match, using a ternary CAM.

As a further alternative embodiment, the extracted header data can be concatenated to form a key that is input to a cache, structured as set of N sets of k entries each. The key is hashed to one of the sets and then matched to one of the k entries in the set. The address of the matching entry can be used as the index to the flow table entry or as an address into a second memory whose addressed entry then provides the index to the flow table entry. As with the CAM embodiment above, a new cache entry is allocated and initialized when the mapping of the packet in the cache fails, and an entry in the cache is deallocated when the corresponding flow table entry goes to zero buffer usage.

Although several mapping exemplars are described, one skilled in the art will realize that mappings other than the present examples can be used. Accordingly, this invention is not limited to any particular type of extracted header data to flow table entry mapping.

Dynamic Buffer Limit (DBL) Computation

Meanwhile, also in a substantially parallel process, an index pointer into the pre-existing dynamic buffer limit (DBL) table 310 is computed, step 392, from the router/switch state parameters 345. This computation is according to the function:

DBL_index=maxQueueLen*(flowsInQueue)+currentQueueLen where maxQueueLen 514 is a fixed router parameter limiting the length of any one queue, flowsInQueue is a count of the number of different flows currently in the output queue for the port, currentQueueLen is a count of the current number of buffer elements in the queue.

Figure 5:
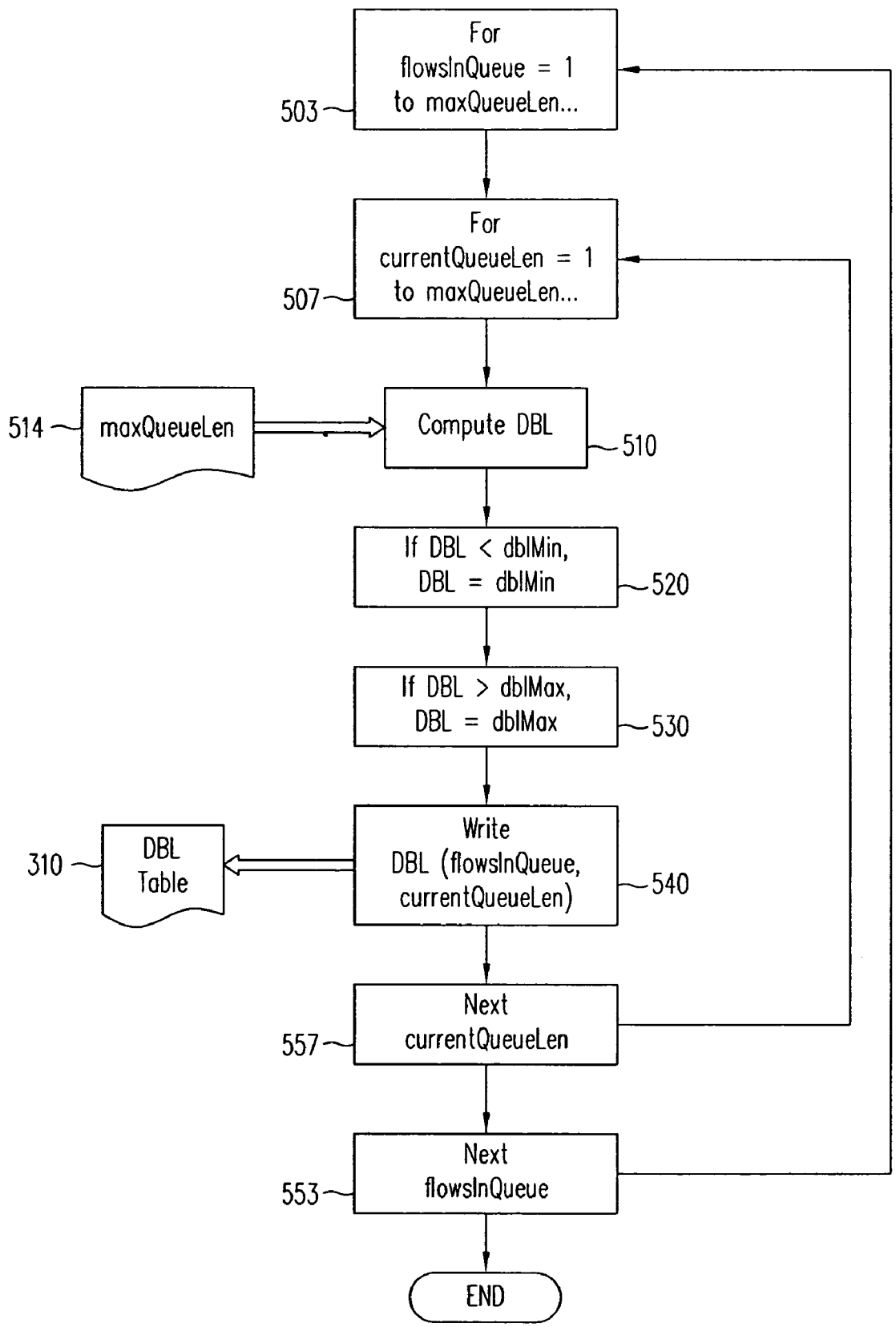
FIG. 5 is a flow chart of the process whereby DBL table 310 of FIG. 3 is created, according to one embodiment of the present invention.

In one embodiment of the present invention, DBL values are stored in a table for rapid lookup. FIG. 5 describes the process whereby the table is created and updated. For a given router/switch state 345, DBL=(maxQueueLen/flowsInQueue)×($K$×maxQueueLen/currentQueueLen)

where K is a tuning parameter that adjusts DBL according to the instantaneously available queue space. This latter adjustment uses the factor maxQueueLen/currentQueueLen times tuning factor K to scale DBL, since maxQueueLen is always greater than or equal to currentQueueLen. Parameter maxQueueLen is an element of router/switch state 345. "Buffer elements" refer to the minimum unit of measurement of data storage in the router/switch and is typically a unit larger than a byte. Units of packets are not recommended as packet size can vary enormously. Likewise, units of bytes are not recommended because too many bits would be required in the flow table to keep the count field. Testing has shown that units ("cells") of 64 byte groups reduce the bits required by six places and yet provide a more accurate count (over units of packets) with minimal inefficiencies. Persons of ordinary skill in the art will of course recognize that other units are possible. As elsewhere, reference to counting units of "buffers" or "cells" is not intended to limit the present invention to any one particular unit size.

If a table of maxQueueLen * maxQueueLen is too large, the values of currentQueueLen and flowsInQueue can be divided by some constant, such as 2, 4, or another power of 2, so that the table is large enough. With a full-sized table, this table lookup is as good as computing it on the spot, but just uses memory rather than random hardware logic or additional software instructions. As the table is reduced in size (by picking a larger constant divisor), the accuracy of the limit provided by DBL is reduced. However, similar shortcuts may be desired when fully computing DBL on each packet, because full multiplies and divides can be approximated to increase the speed and/or simplify the logic.

Computing DBL without considering available queue space would be simpler but might excessively restrict bursts of packets in a given flow when there are only one or two packet flows in the queue, i.e., flowsInQueue is small. Computing DBL without considering flowsInQueue would require DBL to ramp back too aggressively as the queue fills, given that it would not be able to distinguish whether it is a small number of large flows or a large number of small flows that is causing the congestion.

User-specified parameters dblMin and dblMax, referring to steps 520 and 530, are provided to constrain DBL to the range of values between dblMin and dblMax, independent of the above-computed value 510. The parameter dblMin protects fragile flows from dropping. A fragile flow is a flow that sends at a very low rate, such as VoIP or a Telnet session or the flow of TCP acknowledgment packets in the opposite direction to the data flow. Such a flow sends less than dblMin packets in the time required to empty the maximum length queue. For example, with dblMin=2, a queue length of 2,048 entries, a 1 Gigabit per second (Gbps) port and assuming an average packet size of 300 bytes, a fragile flow would be any flow having a data rate of less than 600 Kilobits per second (Kbps).

A dblMin value of 2 appears to be desirable for fragile flows of the type discussed in D. Lin and R. Morris, *Dynamics of Early Detection*, SIGCOMM '97, Cannes, France (Lin & Morris). Parameter dblMax simply prevents DBL from taking on unnecessarily large values; it should be substantially smaller than maxQueueLen. This prevents the queue from becoming over-committed to a single flow during a lull in other traffic.

The process of loading DBL table 310 is a multi-variable loop shown in FIG. 5. Since every queue is limited in length to maxQueueLen 514 cells, in its most congested state, a queue can have up to maxQueueLen flows, given one cell per flow. Accordingly, flowsInQueue ranges from 1 to maxQueueLen and currentQueueLen ranges from 1 to maxQueueLen. Thus, DBL table 310 consists, in worst case, of a maxQueueLen by maxQueueLen array, indexed by flowsInQueue and currentQueueLen.

Loading DBL table 310 begins by initiating for-next loop 563 for variable flowsInQueue 563 and for-next loop 567 for variable currentQueueLen 507. For each instance of (flowsInQueue, currentQueueLen), a DBL is computed, 510. Each DBL is tested against dblMin or dblMax as described above. The resulting value of DBL, limited to dblMin or dblMax as appropriate, is written 540 to DBL table 310 at the location indexed by (flowsInQueue, currentQueueLen). Variable currentQueueLen is incremented 557 and inner loop 567 repeats until variable currentQueueLen=maxQueueLen. At that time, variable flowsInQueue is incremented 553 and table filling proceeds on outer loop 563 until the entire table is filled.

Figure 8:
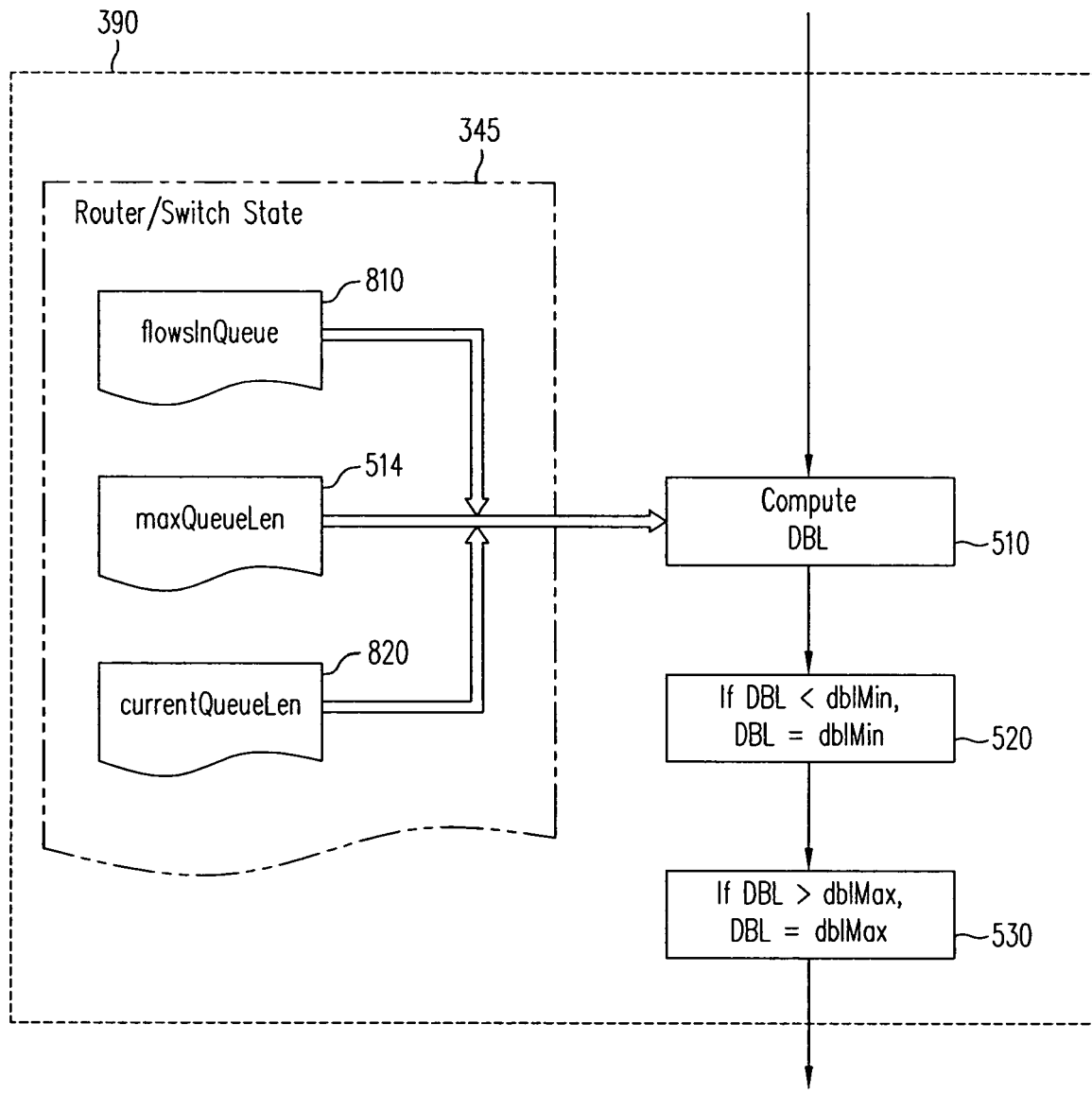
FIG. 8 is an alternate embodiment of the step of get DBL value 390 of FIG. 3.

Alternatively, the DBL value can be computed on the fly for each packet. FIG. 8 illustrates this process. Here, the DBL computation 510, with dblMin and dblMax tests 520 and 530, proceeds as above. However, maxQueueLen 514, flowsInQueue 810, and currentQueueLen 820 are all read directly from router/switch state 345.

Enqueue/Tag Decision

Once the DBL appropriate to the received packet is determined, the current (pre-enqueuing) stored buffer count 334 for the flow is compared to DBL, 320 in FIG. 3. This count is retrieved from the indexed flow table entry, described above. If the buffer count is greater than DBL, the packet is tagged for further processing 340, detailed below. Otherwise, whenever the buffer count is less than or equal to DBL, the packet is enqueued 330.

In an alternate embodiment, a credit field is maintained in the flow table entry for each flow. The credit field is used to help decide whether a packet is enqueued or tagged.

In a further alternate embodiment, the decision to take any further action other than enqueuing is made based on a probability function. For example, a pseudo-random number (PRN) can be generated and compared to a set threshold value. If the PRN is greater than the threshold, the packet is enqueued without further processing or delay.

Enqueuing

Figure 7:
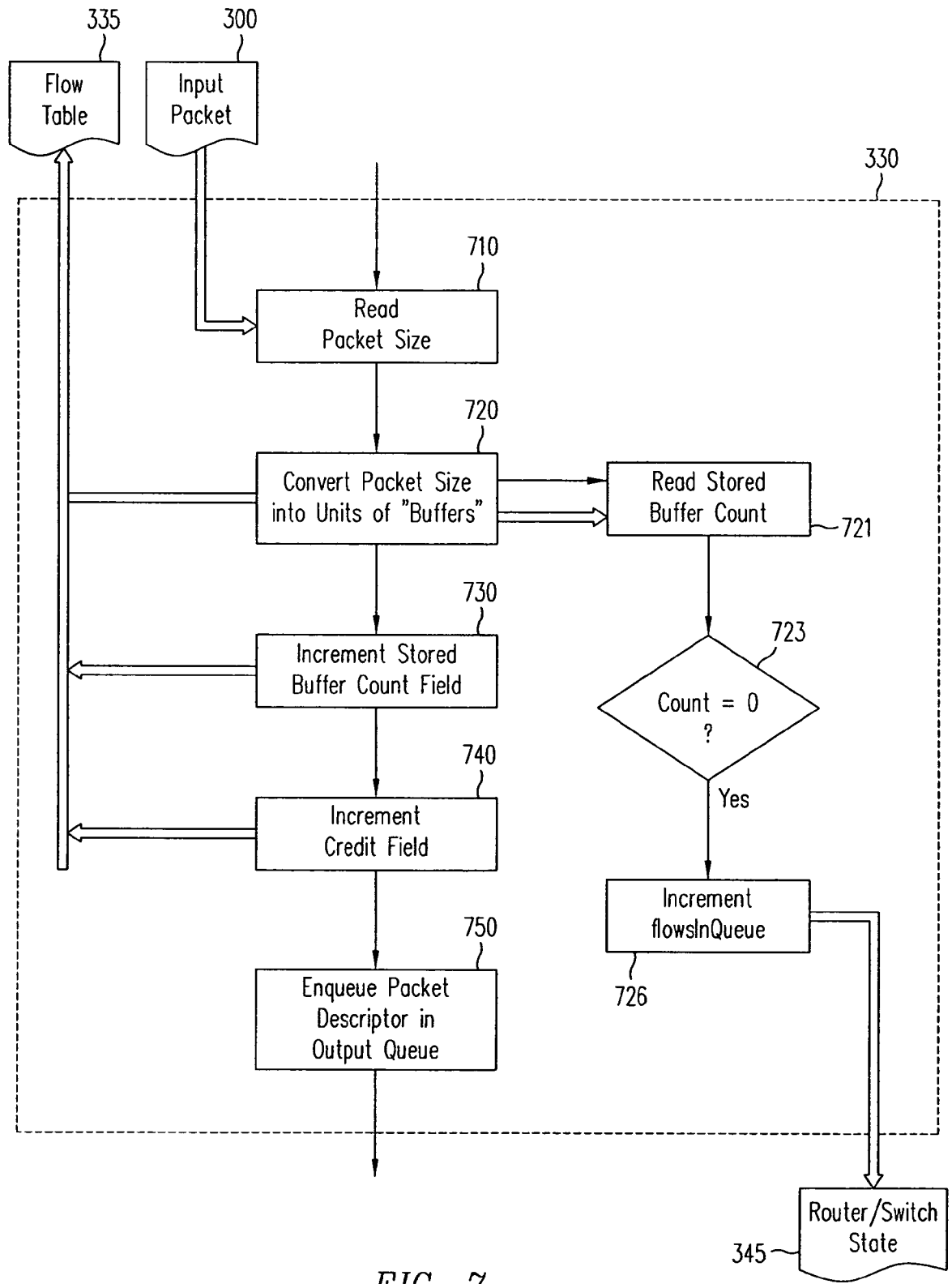
FIG. 7 is a flow chart of the process whereby the step of enqueue packet 330 of FIG. 3 is accomplished, according to one embodiment of the present invention.

When enqueuing, referring to FIG. 7, the buffer count stored in the indexed flow table entry is incremented by the packet's buffer requirement, which is simply the packet size 240 (FIG. 2), read from header 710 and converted into buffer cell units 720 (simply referred to as "buffers") as discussed above. If the buffer count is zero initially 723, the router state parameter flowsInQueue is incremented by one, 726, denoting a new flow.

A credit field may also be maintained in the flow table for each indexed flow table entry. In such an alternate embodiment, the credit value is incremented 740 on enqueuing; on marking or dropping, the credit value is decremented 680 (See FIG. 6). Once a flow exhausts its credits or, alternately, reaches a minimum threshold credit level), a separate NAF limit is enforced on that flow table entry, substantially less than and replacing the DBL. Any new packet exceeding this NAF limit will be dropped. The credits give a flow several packets to respond to the initial packet drop before the flow is classified a NAF. For instance, a TCP flow over its dynamic buffer limit incurring a probability of drop of 0.1 could send roughly 30 packets after the first drop before exhausting its credits and being classified a NAF. The NAF limit can be computed as a function of DBL, such as DBL/4, bounded below by dblMin. Thus, some traffic from a NAF (e.g., small packets) will still be able to get through.

As an alternative to imposing a separate NAF limit, the DBL for the flow can be reduced.

A NAF must stay under the NAF limit for several successful queuing operations to build up enough credits so that it will be reclassified as adapting (that is, a non-NAF) before it will be allowed more queue space. Thus, an unrepentant NAF will be held at the NAF buffer limit; no new packets will be enqueued until some are read out. In order to maintain fair resource allocation even to NAFs, the NAF limit should be set to give about the same throughput bandwidth as a normal, robust (i.e., adaptive) flow.

Note that the basic credit and NAF ramp-back scheme is desirable to ensure both NAFs and "good" flows receive fair allocations of bandwidth. Without a ramp-back to the NAF limit, a NAF would end up with a number of packets slightly less than DBL buffered, while robust flows would back off substantially on each drop to the point where they would have an average number of packets substantially below the soft limit (much less than DBL) buffered. Because bandwidth provided to a flow going to a congested port is proportional to the number of buffers enqueued (for FIFO queuing, typical in internetworking systems), this situation results in far more bandwidth allocated to NAFs than to well-behaved flows. While it may be infeasible to provide equal bandwidth to the different types of flows, because most vary in their reactions to drop depending on round-trip time and window limits, simulation results indicate that the present invention DBL scheme avoids the gross imbalances that might otherwise occur.

Tagging

If the packet is tagged 340, in one embodiment of the present invention it is dropped, i.e., not enqueued and therefore not later transmitted to the destination address. In an alternate embodiment, referring to FIG. 6, tagged packets are not dropped immediately, but tested, 610, first. If the packet qualifies for marking and enqueuing, a mark bit is set 620 in the packet header (such as in the TOS field 210 or options field 230, FIG. 2) and the packet is enqueued normally as shown in FIG. 7 and described above. The mark bit tells subsequent recipients of the packet, be they other routers or switches in the network or the packet's ultimate destination, that the packet passed through congestion. Such a bit setting marking method is similar to using the ECN bit in the proposed IP version 6 (IPv6).

Alternatively, a backchannel message can be sent to the source address to indicate that congestion is beginning to occur and that the source should consider ramping back its flow. Backchannel messages may be sent using the well-known Internet Control Message Protocol (ICMP), for example.

If, however, the packet does not qualify for marking in step 610, it is dropped 650.

In a further alternate embodiment, whether a tagged packet is subsequently dropped is determined probabilistically, i.e., by random selection.

In a still further embodiment, a tagged packet may be forwarded to another software process for additional action instead of being dropped or marked/enqueued.

Transmission of Enqueued Packets

Of course, all routers and switches must also transmit the data they receive. Referring to FIG. 1, data is read out from the queue or queues 40 assigned to each output port 70 in a manner well-known in the art. FIG. 4 shows the steps within the transmission process according to the present invention and more particularly described below.

The packet is transmitted into the network by the switch/router at step 410. Next, packet descriptor 420 is read from the transmit (output) queue. The index, stored in the packet descriptor, is read 430 to enable access to flow table 335.

With the hash embodiment of the mapping to a flow index, storing the index allows the hash seed or function to be changed without producing an incorrect flow entry count. With the embodiment using a CAM or a cache, storing the index allows the entries in the CAM or cache to be moved without producing an incorrect flow entry count.

As an alternative embodiment, the index can be re-determined from the packet header on transmission rather than storing the index in the transmit queue. To avoid incorrect flow entry access in this embodiment, a short generation number can be stored in the transmit queue associated with the packet indicating the version of the mapping used by this packet and this version of the mapping is then queued on transmit to regenerate the same index. In particular, in the case of hashing, the generation number can indicate the previous hash seed that was used. As a simplified alternative, the mapping can simply be required to remain unchanged after initialization until there are no packets enqueued in the switch.

The stored buffer count field stored in the flow table entry is read 440 and decremented 450 by the appropriate number of buffers representing the packet removed for transmission. Recall again that the count of buffers stored in the flow table and the number of buffers in the enqueued packet are expressed in the same units, be they bytes or groups of bytes.

If the stored buffer count field reaches zero, then no more packets from the flow remain in queue. Accordingly, test 460 checks the post-decrement count and decrements 470 the router state variable flowsInQueue if count is zero. The process loops, 9988, as long as there are packets in queue for transmit.

Hard and Soft Limiting Alternate Embodiment

Figure 6:
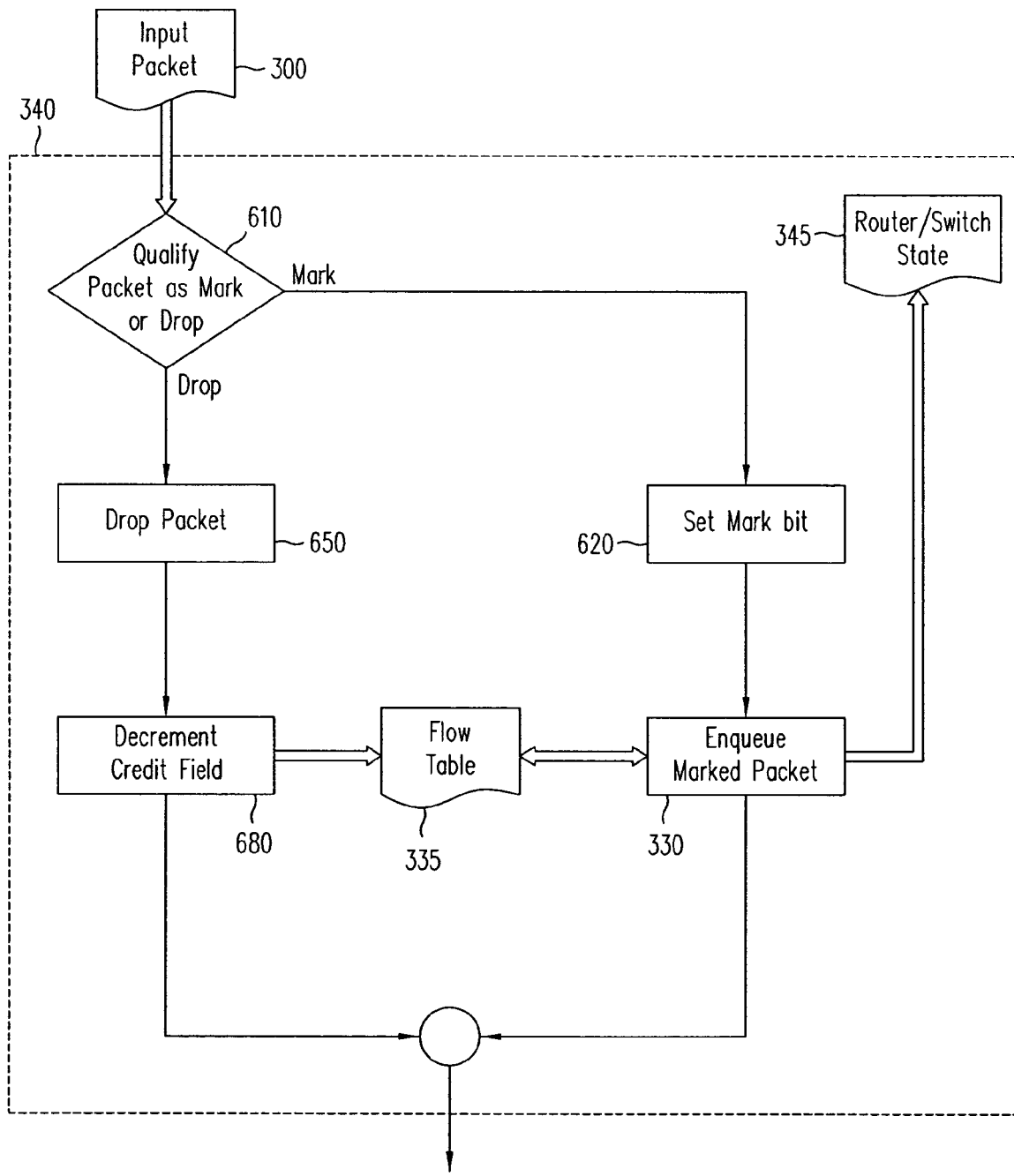
FIG. 6 is a flow chart of the process whereby the step of tag packet 340 of FIG. 3 is accomplished, according to one embodiment of the present invention.
Figure 9:
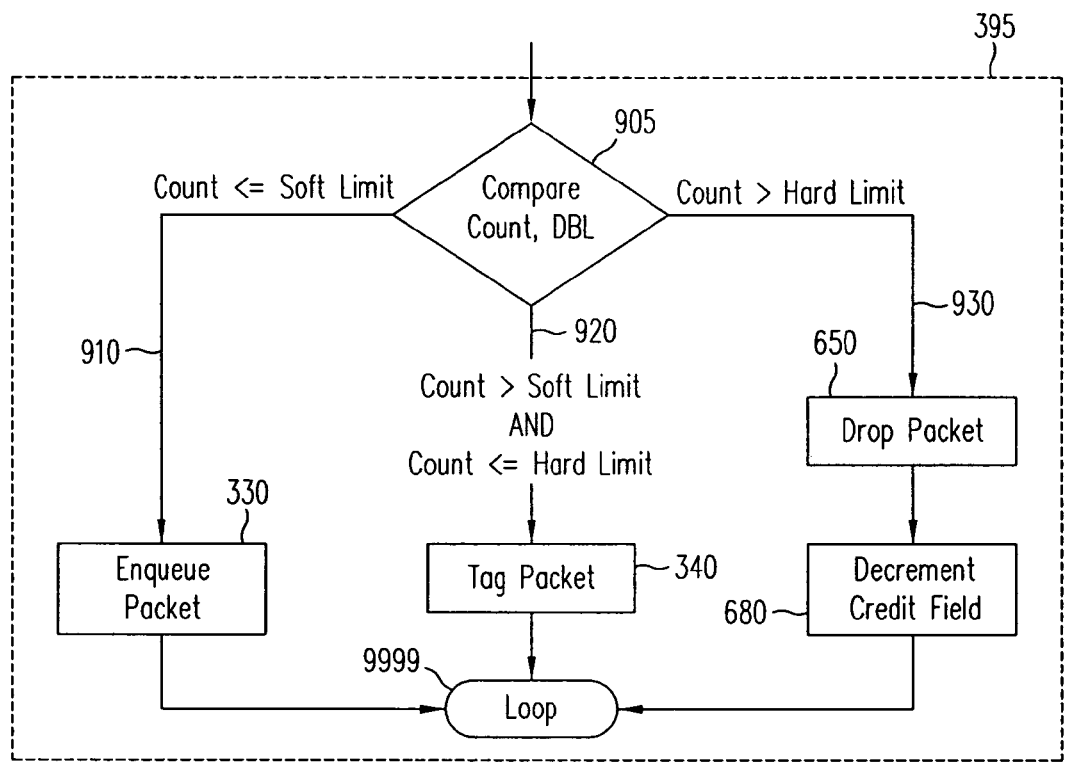
FIG. 9 is an alternate embodiment of the step of comparison 395 of FIG. 3.

A further alternative embodiment implements soft and hard dynamic buffer limits, referring to FIG. 9. Comparison 905 determine the subsequent steps. If the stored buffer count in the flow table entry exceeds a soft limit value and is less than a hard limit (greater than dblMin but less than DBL) 920, the packet is tagged 340 as above. However, it is then dropped or marked based on random selection, i.e., qualification step 610, FIG. 6, is based on a random selection of mark or drop. Such probabilistic drop computations are known in the art and commonly employed in RED-type schemes. If the stored buffer count exceeds the hard limit (DBL) 930, the incoming packet is dropped 650 and the credit field for the flow in flow table 335 is decremented. For simplicity, the soft limit may be set to a fraction of the hard limit so that only the hard limit is non-trivially computed or looked up. Of course, if count is less than or equal to the soft limit, the packet is enqueued 330 as above.

Once the packet is either enqueued or marked, the system loops back to wait for and process the next packet received, 9999. In a substantially parallel process, enqueued packets are transmitted out into the network via output ports 70 (FIG. 1), as described below.

DBL Computation Alternate Embodiments

As discussed above, the DBL values can be computed either a priori to the receipt of a packet (referring to FIG. 5) or dynamically on-the-fly for each packet received (FIG. 8). In either case, the same formula 510, given above, is used to complete the DBL for a given queue at any instant in time. In the case of the pre-computed table, a multi-dimensional array is constructed, indexed by independent variables flowsInQueue 810 and currentQueueLen 820 and containing DBL values as a function of maxQueueLen 514 and the noted independent variables. The size of this DBL lookup table is therefore determined by the range of values for flowsInQueue 512 and currentQueueLen 516, as set by system limitations on the maximum number of recognized flows allowed in any one queue and maxQueueLen, respectively.

In an alternate embodiment, DBL is computed factoring in the round-trip time (RTT) of transmission of a drop or mark notice and receipt of an adapted flow. This is done because a robust flow with a long RTT needs additional buffering at the congestion point to allow time for the source to react to that congestion. In an internet service provider (ISP) backbone environment, for example, this consideration may be significant, given the large amount of buffering required overall (due to the large number of flows) and the wide variation in RTT per flow. The problem to be solved then is to identify flows with long RTT and to adapt DBL appropriately.

One approach is to generate an estimate of RTT based on mapping the packet's source address (SA) and destination address (DA) to a source autonomous system (AS) and a destination AS, respectively, where the AS is a label referring to the group of routers and switches operating under common control. Autonomous system grouping is commonly used in the art to refer to specific wide area or local area networks (WANs or LANs). The estimate of RTT, represented by a round-trip factor (RTF) of from 1 to n bits, is then incorporated into the DBL computation 510 as follows:

$$DBL=(RTF+1) \times (maxQueueLen/flowsInQueue) \times (K \times maxQueueLen/currentQueueLen)$$

Here, a two-bit RTF represents a coarse classification of RTT into small, medium, large, and very large RTTs. One of ordinary skill in the art will appreciate that any number of RTF bits could be used to provide a finer or coarser classification of RTT. For example, a one-bit RTF could be used to simply discriminate local (intra-AS) flows from remote (inter-AS) flows so that DBL is doubled when the flow is from a remote source outside the immediate AS. Even the one-bit RTF implementation carries significant potential utility in that it provides a mechanism to avoid drops on potentially more costly or time-critical remote flows.

In a further alternate embodiment, a class of service/type of service-specific queue and scheduling mechanism provides enhanced immunity from flow latency disruptions due to NAFs. Flows of different kinds of data are directed to different, separate queues and receive forwarding transmission priority concomitant with their content. Differentiation includes class-specific modifications to the DBL so that higher priority flows receive more buffer space. In this embodiment, DBL is computed taking the precedence or type of service of a flow into account. As in the RTT alternative above, DBL is increased for higher precedence flows in order to prevent drops. One of ordinary skill in the art will appreciate that a variety of classification schemes to derive a "TOS factor" analogous to RTF above are possible. Accordingly, the present invention is not limited to one particular method of mapping type of service data, including but not limited to packet source address, destination address, or TOS field values, to a TOS factor for DBL value scaling.

Queuing Decision Alternate Embodiments

Figure 10:
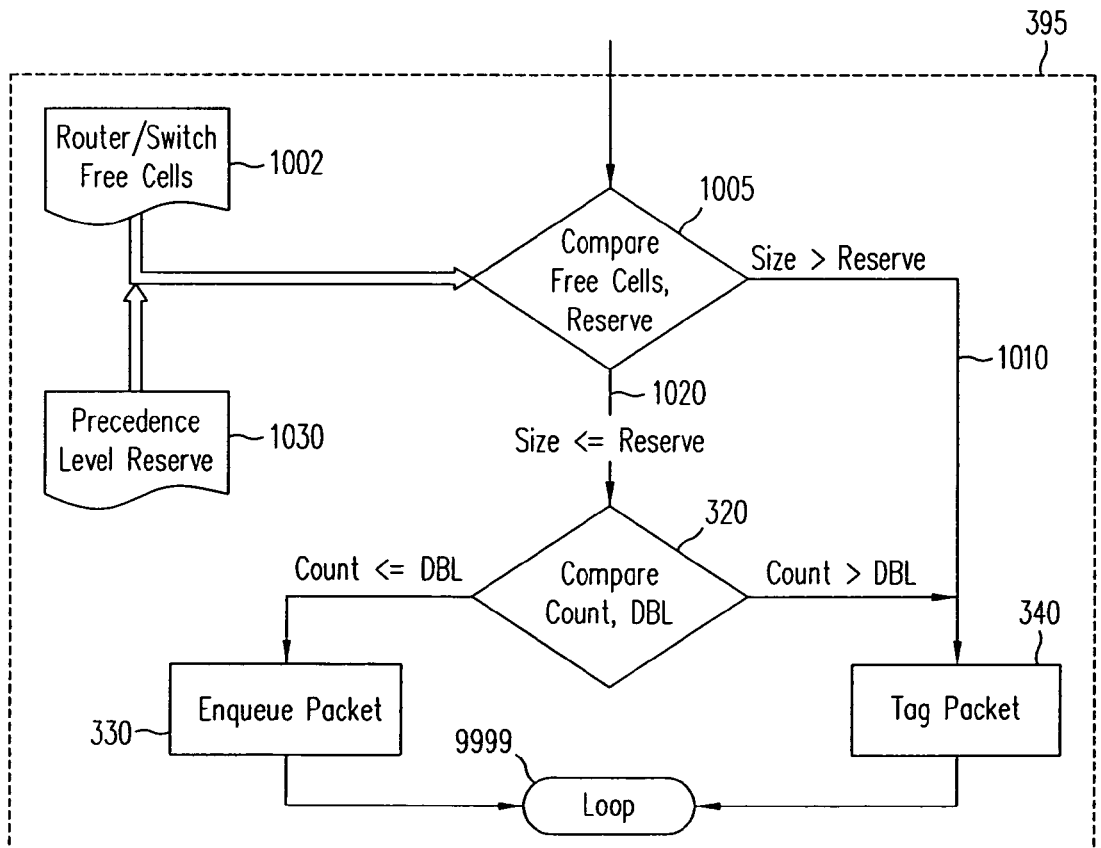
FIG. 10 is a further alternate embodiment of the step of comparison 395 of FIG. 3.

In an alternate embodiment to the invention described above, the decision to enqueue a packet is further conditioned on either the state of buffer and queue reserves or the class of service of the input packet. Class of service is sometimes referred to as type of service (TOS), reflecting the eponymous field in the IP packet header. In a further alternate embodiment, FIG. 10, both reserve state and TOS are factored into the queuing decision. Both alternatives rely on identifying the class of service in a given flow and its precedence (priority) relative to other flows.

In the reserve alternative, a device-wide reserve pool of buffer cells 1030 is maintained for each precedence level defined by TOS. A shared buffer pool is assumed for the device. (Recall from above that a buffer cell is the minimum unit of buffer space allocation. It may be a byte or a group of bytes.) Router/switch state parameter free cells 1002 is compared to reserve 1030 for the appropriate TOS, 1005. A packet is tagged 340, rather than tested against DBL 320, if the number of free cells on its arrival is less than the total reserve set aside for packets of higher precedence level. A much more limited scheme is used currently in the art to ensure that control packets (e.g., STP packets for layer 2 functions) are always transmitted and never dropped. In addition, a reserve of output queue space is also maintained for each precedence level. The process for testing free cells against queue reserves is the same: a packet is tagged 340 if the remaining space in the queue is less than the reserve set aside for higher precedence packets. Such a scheme has the advantage of enabling differentiated handling of packets of different precedence levels at a later processing point by preventing packet drop due to a lack of either buffers or queue space.

In the type of service queuing embodiment (not shown), a separate queue is provided for each class of service assigned to an output port, rather than a single queue or multiple undifferentiated queues per port. Each queue on a given port still uses the same flow table and the same per-queue, per-packet computations and enqueuing decisions discussed above. The improvement in performance comes from the fact that, with equal transmission scheduling among the active queues on a given port, a separate queue provides better service for flows mapped into it that present a smaller amount of data to the queue. Thus, a queue containing a class of service characterized by small number of small flows will experience less delay in scheduled transmission. For example, with two queues and equal scheduling, if the "high priority" class of service queue has one fourth of the traffic, a high priority flow should experience half the delay of a normal priority flow. This is so because each queue gets half the transmission bandwidth, but the high priority queue has only one quarter of the traffic. In general, if a queue is allocated X percent of the port bandwidth and Y percent of the traffic, the delay should be reduced by X/Y percent relative to a single queue scheme. The amount of traffic to the port and the percentage of output port bandwidth allocated to each queue determine the delay reduction available to a given class of service.

Although TOS and class of service are described, those skilled in the will art realize that methods of determining precedence are not limited to the TOS field in an IP packet header. For example, precedence may be determined by reference solely to the source address of a packet. Accordingly, the invention is not limited to any particular method of precedence determination.

CONCLUSION

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

We claim:

1. A system comprising a plurality of input devices a plurality of buffers, and a plurality of output queues interoperably connected to each other, the system further comprising a computer readable medium encoded with computer instructions executable by a processor for:

extracting at least one field from a data packet received via one of the plurality of input devices;

determining a flow table index value from the at least one field, wherein the flow table index value belongs to a first set of values, and wherein a maximum number of values in the first set of values is less than a maximum number of possible flows;

reading a flow table entry corresponding to the flow table index value; and comparing the flow table entry with a buffer limit value.

2. The system of claim 1 wherein the at least one field from a data packet includes a source address field and a destination address field.

3. The system of claim 1 further comprising computer instructions for:

storing the flow table index value.

4. The system of claim 3 wherein the computer instructions for storing the flow table index value further comprise computer instructions for storing the flow table index value in a packet description field corresponding to a queue.

5. The system of claim 1 wherein the at least one field from a data packet includes a first field and a second field, and wherein the computer instructions for determining a flow table index value further comprise computer instructions for:

concatenating at least a portion of the first field and at least a portion of the second field to form a key.

6. The system of claim 5 further comprising computer instructions for:

accessing at least one of a content addressable memory and a cache memory using the key.

7. The system of claim 1 wherein the buffer limit value represents an upper bound of memory space to be allocated to the data packet.

8. The system of claim 1 further comprising computer instructions for:

reading the buffer limit value from a table.

9. The system of claim 1 further comprising computer instructions for:

computing the buffer limit value when needed.

10. The system of claim 1 wherein the buffer limit value is based on at least one parameter describing a queue.

11. The system of claim 10 wherein the buffer limit value is further based on a tuning parameter.

12. The system of claim 1 further comprising computer instructions for:

computing the buffer limit value using at least one of a maximum constraint and a minimum constraint.

13. The system of claim 1 further comprising computer instructions for:

computing the buffer limit value using at least one of a round-trip time of transmission and an estimated round-trip time of transmission.

14. The system of claim 1 further comprising for:

taking an action on the packet based on the comparing the flow table entry with a buffer limit value.

15. A system comprising a plurality of input devices, a plurality of buffers, and a plurality of output queues interoperably connected to each other, the system further comprising a computer readable medium encoded with computer instructions executable by a processor for:

extracting at least one field from a data packet received via one of the plurality of input devices, wherein the at least one field from a data packet includes a source address field and a destination address field;

determining a flow table index value from the at least one field, wherein the computer instructions for determining a flow table index value further comprise computer instructions for at least one of:

adding the source address field to the destination address field;

performing an exclusive OR (XOR) operation using the source address field and the destination address field as operands; and adding the source address field to the destination address field to form a sum and performing a bitwise shift operation on at least a portion of the sum;

reading a flow table entry corresponding to the flow table index value; and comparing the flow table entry with a buffer limit value.

16. A system comprising a plurality of input devices, a plurality of buffers, and a plurality of output queues interoperably connected to each other, the system further comprising a computer readable medium encoded with computer instructions executable by a processor for:

extracting at least one field from a data packet received via one of the plurality of input devices;

determining a flow table index value from the at least one field, wherein the computer instructions for determining a flow table index value further comprise computer instructions for using a first hashing algorithm, and wherein the system further comprises computer instructions for:

determining a second flow table index value from the at least one field using a second hashing algorithm;

reading a flow table entry corresponding to the flow table index value; and comparing the flow table entry with a buffer limit value.

17. The system of claim 16 wherein the first hashing algorithm and the second hashing algorithm differ by a seed value.

18. A system comprising a plurality of input devices, a plurality of buffers, and a plurality of output queues interoperably connected to each other, the system further comprising a computer readable medium encoded with computer instructions executable by a processor for:

extracting at least one field from a data packet received via one of the plurality of input devices;

determining a flow table index value from the at least one field;

reading a flow table entry corresponding to the flow table index value;

computing a table index based on at least one parameter describing a queue; and reading a buffer limit value from a table, wherein the reading further comprises selecting the buffer limit value from the table using the table index; and comparing the flow table entry with the buffer limit value.

19. The system of claim 18 wherein the at least one parameter includes at least one of a maximum queue length value, a number of flows value, and a current queue length value.

20. A computer readable medium comprising program instructions executable on a processor, the computer readable medium being at least one of an electronic storage medium, a magnetic storage medium, or an optical storage medium, wherein the program instructions are executed to implement each of:

extracting at least one field from a data packet received via one of a plurality of input devices;

determining a flow table index value from the at least one field, wherein the flow table index value belongs to a first set of values, and wherein a maximum number of values in the first set of values is less than a maximum number of possible flows;

reading a flow table entry corresponding to the flow table index value; and comparing the flow table entry with a buffer limit value.

21. The computer readable medium of claim 20 wherein the at least one field from a data packet includes a source address field and a destination address field.

22. The computer readable medium of claim 20 further comprising program instructions executed to implement:
storing the flow table index value.

23. The computer readable medium of claim 22 wherein the program instructions executed to implement storing the flow table index value further comprise program instructions executed to implement storing the flow table index value in a packet description field corresponding to a queue.

24. The computer readable medium of claim 20 wherein the at least one field from a data packet includes a first field and a second field, and wherein the program instructions executed to implement determining a flow table index value further comprise program instructions executed to implement:
concatenating at least a portion of the first field and at least a portion of the second field to form a key.

25. The computer readable medium of claim 24 further comprising program instructions executed to implement:
accessing at least one of a content addressable memory and a cache memory using the key.

26. The computer readable medium of claim 20 wherein the buffer limit value represents an upper bound of memory space to be allocated to the data packet.

27. The computer readable medium of claim 20 further comprising program instructions executed to implement:
reading the buffer limit value from a table.

28. The computer readable medium of claim 20 further comprising program instructions executed to implement:
computing the buffer limit value when needed.

29. The computer readable medium of claim 20 wherein the buffer limit value is based on at least one parameter describing a queue.

30. The computer readable medium of claim 29 wherein the buffer limit value is further based on a tuning parameter.

31. The computer readable medium of claim 20 further comprising program instructions executed to implement:
computing the buffer limit value using at least one of a maximum constraint and a minimum constraint.

32. The computer readable medium of claim 20 further comprising program instructions executed to implement:
computing the buffer limit value using at least one of a round-trip time of transmission and an estimated round-trip time of transmission.

33. The computer readable medium of claim 20 further comprising program instructions executed to implement:
taking an action on the packet based on the comparing the flow table entry with a buffer limit value.

34. A computer readable medium comprising program instructions executable on a processor, the computer readable medium being at least one of an electronic storage medium, a magnetic storage medium, or an optical storage medium, wherein the program instructions are executed to implement each of:
extracting at least one field from a data packet received via one of a plurality of input devices wherein the at least one field from a data packet includes a source address field and a destination address field;
determining a flow table index value from the at least one field; wherein the program instructions executed to implement the determining a flow table index value further comprise program instructions executed to implement at least one of:
adding the source address field to the destination address field;
performing an exclusive OR (XOR) operation using the source address field and the destination address field as operands; and
adding the source address field to the destination address field to form a sum and performing a bitwise shift operation on at least a portion of the sum;
reading a flow table entry corresponding to the flow table index value; and
comparing the flow table entry with a buffer limit value.

35. A computer readable medium comprising program instructions executable on a processor, the computer readable medium being at least one of an electronic storage medium, a magnetic storage medium, or an optical storage medium, wherein the program instructions are executed to implement each of:
extracting at least one field from a data packet received via one of a plurality of input devices;
determining a flow table index value from the at least one field; wherein the program instructions executed to implement the determining a flow table index value further comprise program instructions executed to use a first hashing algorithm, and wherein the computer readable medium further comprises program instructions executed to implement:
determining a second flow table index value from the at least one field using a second hashing algorithm;
reading a flow table entry corresponding to the flow table index value; and
comparing the flow table entry with a buffer limit value.

36. The computer readable medium of claim 35 wherein the first hashing algorithm and the second hashing algorithm differ by a seed value.

37. A computer readable medium comprising program instructions executable on a processor, the computer readable medium being at least one of an electronic storage medium, a magnetic storage medium, or an optical storage medium, wherein the program instructions are executed to implement each of:
extracting at least one field from a data packet received via one of a plurality of input devices;
determining a flow table index value from the at least one field;
reading a flow table entry corresponding to the flow table index value;
computing a table index based on at least one parameter describing a queue; and
reading a buffer limit value from a table, wherein the reading further comprises selecting the buffer limit value from the table using the table index; and
comparing the flow table entry with the buffer limit value.

38. The computer readable medium of claim 37 wherein the at least one parameter includes at least one of a maximum queue length value, a number of flows value, and a current queue length value.

* * * * *